United States Patent
Chang et al.

(10) Patent No.: US 6,308,178 B1
(45) Date of Patent: Oct. 23, 2001

(54) SYSTEM FOR INTEGRATING DATA AMONG HETEROGENEOUS SYSTEMS

(75) Inventors: Chia-Pei Chang, Chicago; Brian J. Connolly, Hoffman Estates; Eric Blackledge, Woodstock; Robert John Hoffman, Wheeling; Bob Homan, Niles; Klaus Schulz, Downers Grove, all of IL (US)

(73) Assignee: Darc Corporation, Chicago, IL (US)

( * ) Notice: Subject to any disclaimer, the term of this patent is extended or adjusted under 35 U.S.C. 154(b) by 0 days.

(21) Appl. No.: 09/442,089

(22) Filed: Oct. 21, 1999

(51) Int. Cl.[7] .................................................. G06F 17/30

(52) U.S. Cl. ............................... 707/100; 707/6; 707/10; 707/104.1; 709/225; 709/320; 717/1; 717/5

(58) Field of Search ................................. 707/4, 6, 9, 10, 707/102, 103, 100, 104.1; 709/320, 225; 712/3; 717/1, 5; 358/1.16

(56) References Cited

U.S. PATENT DOCUMENTS

| | | | |
|---|---|---|---|
| 4,873,630 | * 10/1989 | Rusterholz et al. | 712/3 |
| 5,210,870 | * 5/1993 | Baum et al. | 707/7 |
| 5,297,279 | 3/1994 | Bannon et al. | 707/103 R |

(List continued on next page.)

FOREIGN PATENT DOCUMENTS 1 016 989 A2   5/2000   (EP).

OTHER PUBLICATIONS

Hsu, Cheng et al., "A Metadata System For Information Modeling And Integration", Proceedings of the First International Conference on Systems Integration, 22–26 Apr. 1990, pp. 616–624.*

Huang, Jer–Wen, "MultiBase: A Heterogeneous Multidatabase Management System", Proceedings of the Eighteenth Annual International Computer Software and Applications Conference. COMPSAC 94. Nov. 9–11, 1994 pp. 332–339.*

Lim, Ee–Peng et al., "A Relational Interface for Heterogenous Information Sources", Proceedings of the IEEE International Forum on Research and Technology Advances in Digital Libraries, 1997. ADL '97. May 7–9, 1997, pp. 128–139.*

Blanco, Jose, et al., Building a Federal Relational Database System: An Approach Using A Knowledge–Based System, International Journal of Intelligent & Cooperative Information Systems, Dec. 1994, vol. 3, No. 4, pp. 415–455.

*Primary Examiner*—Hosain T. Alam
*Assistant Examiner*—Shahid Alam
(74) *Attorney, Agent, or Firm*—Barnes & Thornburg

(57) ABSTRACT

A system for integrating data among heterogeneous source applications and destination applications including a knowledge repository containing temporary data storage for storing data from the source applications during processing for population in the destination applications, a library of data elements each providing a discrete data manipulation friction, configuration data storage for storing user-provided information describing the integration environment, and a plurality of add-on modules or cartridges which each include a plurality of predefined instruction sets defining chains of data elements to perform interface functions corresponding to a particular destination application. The underlying interface communication and processing functions are performed by an active component (or engine) according to the configuration data and the module instruction sets. The active component is driven by the repository data to load source data into the temporary data storage, translate, synchronize, and validate that data, then interface the data to a destination application. A configuration interface permits the user to configure the system.

34 Claims, 6 Drawing Sheets

U.S. PATENT DOCUMENTS

| | | | |
|---|---|---|---|
| 5,369,778 | 11/1994 | San Soucie et al. | 707/103 |
| 5,390,330 | 2/1995 | Talati | 717/3 |
| 5,428,791 | 6/1995 | Andrew et al. | 717/3 |
| 5,504,885 * | 4/1996 | Alashqur | 707/100 |
| 5,542,078 | 7/1996 | Martel et al. | 707/101 |
| 5,548,769 * | 8/1996 | Baum et al. | 707/1 |
| 5,566,330 | 10/1996 | Sheffield | 707/4 |
| 5,596,744 | 1/1997 | Dao et al. | 707/10 |
| 5,634,053 * | 5/1997 | Noble et al. | 707/4 |
| 5,634,124 | 5/1997 | Khoyi et al. | 707/103 |
| 5,692,183 | 11/1997 | Hapner et al. | 707/103 |
| 5,721,912 * | 2/1998 | Stepczyk et al. | 707/102 |
| 5,745,765 | 4/1998 | Paseman | 717/1 |
| 5,764,973 | 6/1998 | Lunceford et al. | 707/1 |
| 5,781,905 | 7/1998 | Awane et al. | 702/102 |
| 5,850,548 | 12/1998 | Williams | 717/1 |
| 5,857,194 | 1/1999 | Kelliher et al. | 707/101 |
| 5,862,372 | 1/1999 | Morris et al. | 717/1 |
| 5,875,330 | 2/1999 | Goti | 717/1 |
| 5,878,425 | 3/1999 | Redpath | 707/102 |
| 5,884,079 | 3/1999 | Furusawa | 717/1 |
| 5,893,911 | 4/1999 | Piskiel et al. | 707/10 |
| 5,924,101 | 7/1999 | Bach et al. | 707/103 |
| 5,946,694 | 8/1999 | Copeland et al. | 707/103 |
| 5,950,001 | 9/1999 | Hamilton et al. | 717/1 |
| 5,970,490 * | 10/1999 | Morgenstern | 707/10 |
| 5,974,413 * | 10/1999 | Beauregard et al. | 707/6 |
| 6,185,629 * | 2/2001 | Simpson et al. | 707/10 |
| 6,236,994 * | 5/2001 | Swartz et al. | 707/6 |

* cited by examiner

SYSTEM FOR INTEGRATING DATA AMONG HETEROGENEOUS SYSTEMS

FIELD OF THE INVENTION

The present invention relates generally to Enterprise Application Integration "EAI") software, and more particularly to a configurable software system for providing migration of data among heterogeneous applications without requiring the development of code to accommodate the specific requirements of the heterogeneous applications present in a particular environment.

BACKGROUND OF THE INVENTION

EAI software is generally designed to address the need of business to integrate various business software applications employed by the diverse operating sectors of a single business organization (for example, financial operations, human resources, shipping and receiving, etc.), or by such operating sectors of multiple organizations. Over time, many organizations incorporate disparate software applications, each designed to manage a specific business function or set of functions. Accordingly, data related to these business functions is dispersed across the organization, and resides separately within the various software applications.

Unfortunately, various software applications maintain data according to different data models, such as hierarchical networks, relational models, spreadsheets, multimedia databases, knowledge databases and other types of data models. Eventually, as more and more such applications are added to an organization, the need for data synchronization (or updating) and migration among applications grows. Thus, intelligent management, manipulation, and maintenance of organization-wide data requires an integration system capable of providing data transfer interfaces among the various heterogeneous applications employed throughout the organization (or across various organizations).

One product commonly found in modem business enterprises falls within the broad category of Enterprise Resource Planning "ERP") software which generally provides packaged suites of business applications. Examples of such ERP software include offerings by Oracle Corporation, SAP, PeopleSoft, and Baan. These ERP products may replace many individual business function applications with a single, integrated suite of applications, encompassing business operations including accounting, purchasing, shipping and receiving, human resources, etc. Notwithstanding a proliferation of such consolidated products, many organizations also maintain a variety of disparate applications as described above. Additionally, many organizations employ similar or identical ERP products at geographically diverse locations. Thus, integration among these heterogeneous applications and consolidated ERP products, as well as integration among ERP products, is desirable.

Various methods of meeting the above-described integration needs presently exist. One method is the development of custom integration software to interface, for example, an organization's specific set of heterogeneous applications with the applications within the organization's ERP product. The custom integration method employs a traditional software development model wherein custom code is written specifically to operate with a fixed group of heterogeneous applications and integrate them with an ERP product of a particular version. This method is time consuming, labor intensive and expensive to implement. Moreover, after the custom code is written, implemented, and tested, it provides the required integration only so long as the environment remains unchanged. When, for example, an updated version of the organization's ERP product is released, the custom integration software must be updated to correspond with the new version. This maintenance is also time-consuming and expensive. Additionally, because the timing of such maintenance depends entirely upon the new ERP product's release date, the associated costs are unpredictable and, therefore, difficult to budget.

Off-the-shelf, front-end integration packages, such as those provided by Cross Worlds or Constellar, are also available to address an organization's integration needs. This software is attached to the heterogeneous source applications and is used to query the source applications to obtain the desired data. Whole files are not transferred from a source application to a destination application for manipulation and use. More importantly, this front-end integration software does not directly integrate with the applications at the destination end, but instead requires a software developer to generate custom code to bridge the gap between the front-end package and the destination applications. Accordingly, this software shares some of the costs and inflexibility disadvantages inherent in custom-built interfaces.

Other integration tools, such as products like Smart dB, include templates to connect destination applications with back-end servers and source applications. These templates reduce labor costs by reducing the complexity of the overall integration task. However, such template tools are also undesirable because developers must write custom code to bridge the gap between the source applications and the templates.

SUMMARY OF THE INVENTION

The integration system of the present invention provides a flexible, end-to-end integration solution that manages all mapping, validation, and synchronization of data among heterogeneous source and destination applications within an organization and among the applications of multiple organizations. The system includes an active component (or engine) that performs the underlying communication and data processing functions, and a repository of information used by the active component relating to the characteristics of the source and destination applications. The functionality of the system is expandable through use of modules (or cartridges) that may be added to the repository as the organization's integration requirements expand. The modules are configurable, pre-built integration packages, which may be specific to a particular database application (for example, a particular application within an ERP product such as Oracle Applications). Once the repository is configured with information describing data contained within the organization's heterogeneous source applications, each module defines interface processes or instruction sets which migrate data between the source applications and a particular destination application. The active component is driven by instruction sets associated with the applicable module and other information in the repository to read and process inputs from a source application and perform the transfer of data to a destination application.

In addition to the modules, the repository includes configuration data relating to each installed module. Upon installation or expansion of a particular integration system according to the present invention, a user may activate a configuration interface provided with the system to configure the system to operate with the installed modules. During this process, configuration data is created and stored in the configuration data storage section of the repository within a portion of the configuration data storage corresponding to the applicable module. The active component uses the configuration data to determine which instruction sets (contained within the modules) to access. The modules assemble the instructions by accessing data elements (individual units of re-usable code) stored in a repository library. Since multiple modules may access the same data elements, updates to the library data elements are universally applicable to a variety of modules.

By providing a standard interface methodology that incorporates a collection of rules describing a particular destination application, the integration system of the present invention eliminates the need for custom software and the disadvantages of the development life cycle associated therewith, reduces user learning curves by virtue of the knowledge contained within the repository, eliminates manual data entry, and provides an upgrade path to future releases of the destination application, thereby reducing the cost of ownership. Updates may be accomplished by revising the repository and adding new modules, and distributing them as replacements to all organizations employing the revised destination application.

Additional features and advantages of the present invention will become more apparent to those skilled in the art upon consideration of the following detailed description of embodiments of the invention in conjunction with the accompanying drawings.

DESCRIPTION OF THE EMBODIMENTS OF THE INVENTION

The embodiments described herein are not intended to be exhaustive or to limit the invention to the precise forms disclosed. Rather, the embodiments selected for description are described so that those skilled in the art may utilize their teachings.

Figure 1:
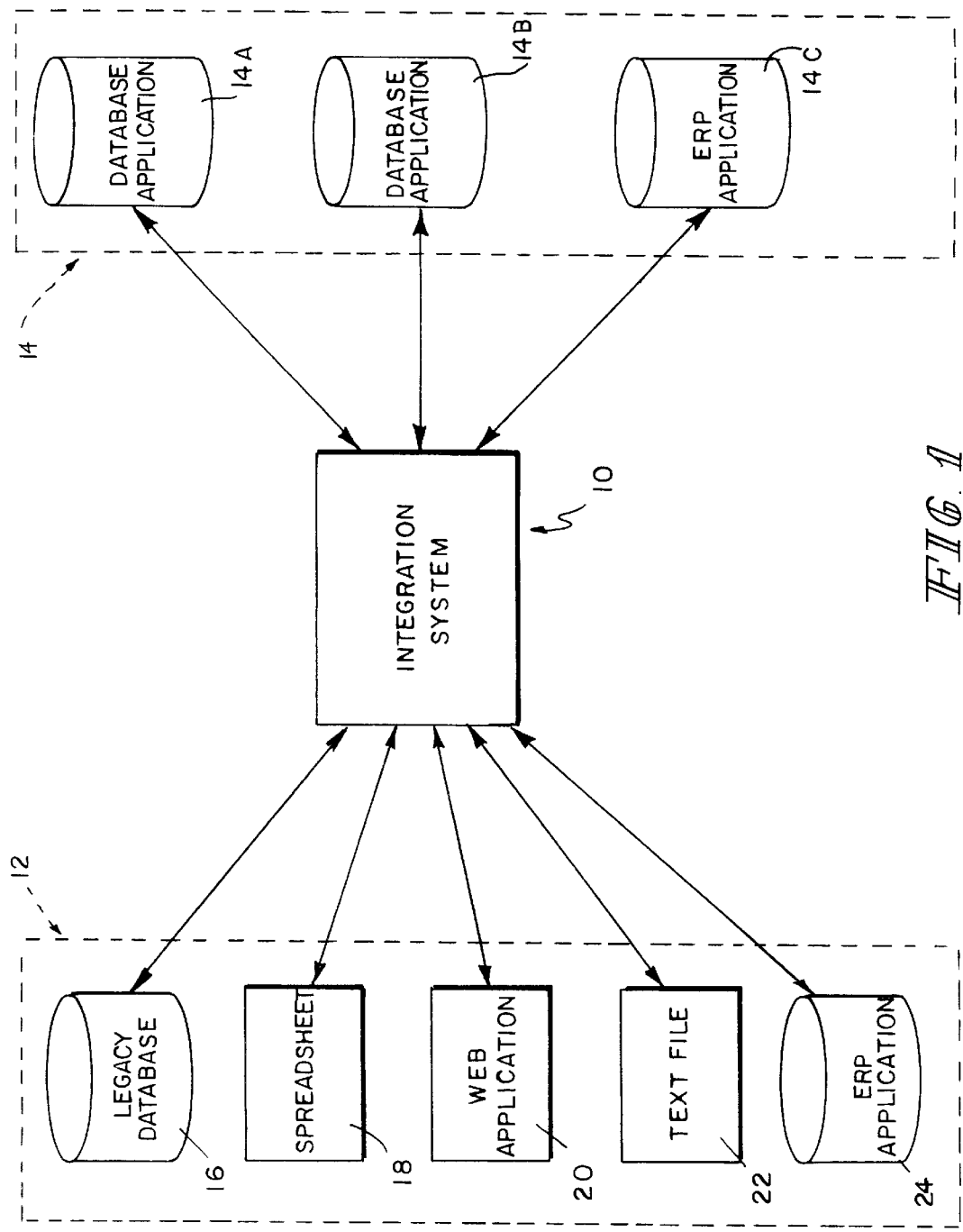
FIG. 1 is a block diagram illustrating installation of the present integration system in an environment.

FIG. 1 is a block diagram illustrating an installation of an integration system 10 according to the present invention to provide for migration of data among a variety of heterogeneous applications (hereinafter collectively referred to as "source applications 12") and a variety of database applications (hereinafter collectively referred to as "destination applications 14"). In one embodiment of the invention, system 10 is a pre-built, open application programming interface "API") which can operate as a conversion interface, providing one-time data transfer from source applications 12 to destination applications 14, and/or a standard interface providing periodic data exchange among applications. As indicated above, destination applications 14 may include suites of business applications provided by ERP products such as those produced by Oracle Corporation, SAP, PeopleSoft and Baan. The architecture of the present invention, however, and the concepts 4088 and methodologies taught herein are equally applicable to any database application, including but not limited to those listed above. To simplify this description of the invention, destination applications 14 will be assumed to be Oracle Applications.

Source applications 12 may include any combination of legacy database applications 16, spreadsheet applications 18, web applications 20, applications containing text files 22, or even ERP applications 24. Destination applications 14 may include any combination of database applications 14A, 14B and ERP applications 14C. Because integration system 10 is configurable to correspond to source applications 12 and provides incremental functionality to accommodate use of future destination applications 14, the system offers a flexible solution for users who desire to maintain and use the data residing in their existing source applications.

Figure 2:
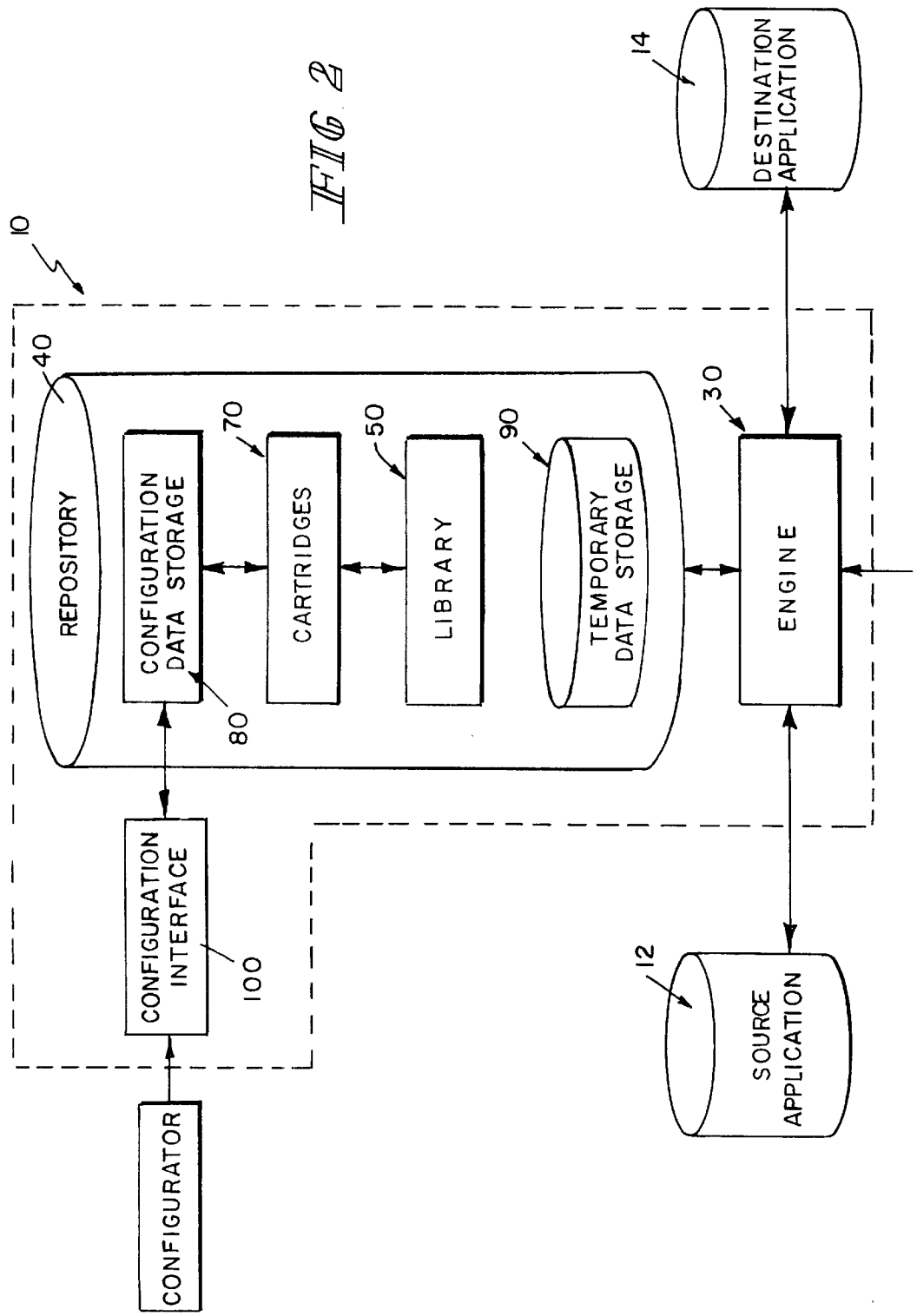
FIG. 2 is a block diagram of the integration system of FIG. 1.

FIG. 2 depicts the basic components of integration system 10. System 10 generally includes an active component 30 (or engine) which provides generic interface functionality, and a knowledge repository 40. Repository 40 generally includes a library 50 having data elements 60 (as will be discussed in greater detail below), a plurality of plug-in modules 70 (i.e., software add-ons configured to operate with active component 30 to add increased functionality to system 10), which along with library 50, provide the business rules, instructions, and roadmaps to define interface processes and direct data migration, configuration data storage 80 containing configuration data which relates to the requirements of source 12 and destination 14 applications interfaced by a particular module 70 (i.e., "metadata" or data describing characteristics of other data), and temporary data storage 90 used by active component 30 for temporarily storing data during data processing. In one embodiment of the invention, configuration data of configuration data storage 80, data elements 60 of library 50, and temporary data of temporary data storage 90 are all stored as Oracle tables within a relational database represented by repository 40. Other formats for maintaining this information may be employed by one of ordinary skill in the art. Accordingly, this invention is not to be limited to the information storage format described herein.

Repository 40 essentially stores business logic that may relate to the entire suite of applications 14 available at the destination end of system 10. This business logic (or sets of rules) describes the structure and basic functionality of the destination applications 14, and includes a plurality of shareable components (data elements 60) which are used to migrate data to the destination applications 14. Modules 70 use data elements 60 to perform application-related operations.

Configuration data storage 80 may include information describing the source of the input data, the inputs to include with an interface, directions for processing and transforming data, extensions to a particular module 70, additional validation rules, data synchronization instructions, and workflow instructions as will be described in greater detail below. Configuration data storage 80 is created using a configuration interface 100 consisting of a series of interactive screens which permit the user to input the above-described information to set-up and install an interface between source 12 and destination 14 applications. Using configuration interface 100, source inputs (corresponding to data residing in source applications 12) are defined. The user may also select from the available inputs in source application 12 known by module 70 being installed.

Configuration interface 100 also permits the user to define the properties of temporary tables stored in temporary data storage 90 of repository 40 which are used by active component 30 as it processes data migrating between a source 12 and destination 14 application. These tables, in one embodiment, are physical tables given a user-defined name, having columns which include all relevant inputs from source application 12, all outputs to destination application 14, and all relevant inputs and outputs of data elements 60 used by modules 70. Each module 70 includes a list of predefined tables that are configured to work with the relevant destination application 14 that will receive the inputs. For example, a purchase order Oracle Application module 70 includes tables for headers, line items, shipment information, and so on. Configuration interface 100 displays screens listing the tables available for any particular module 70. The user may select some or all of the predefined tables to be populated with the input data. It should be understood, however, that by incorporating additional functionality in the library 50, modules 70, or active component 30, the "staging area" or "workspace" provided by temporary data storage 90 may be eliminated. Finally, the user may select a table in destination application 14 that will receive the data. Each predefined table associated with each module 70 includes a list of compatible Oracle tables that can accept the inputs of the temporary tables stored in temporary data storage 90.

Configuration interface 100 additionally permits the user to specify information about the files that will send the inputs to the predetermined tables of temporary data storage 90. By filling out information on the screens presented by configuration interface 100, the user may specify, for example, the length of fields located within a particular file of source application 12, the organization of the data and header information within the file, and how the datafields will be separated if they are not of fixed lengths. Since according to one embodiment of the invention, modules 70 are configured to correspond with Oracle destination applications 14, if source application 12 is an Oracle database, system 10 communicates with the source application directly using SQL*Net (an Oracle program that permits communication over a network between a client and database server). If source application 12 is not an Oracle database, system 10 communicates with source application 12 to transfer data into files which system 10 transfers to tables in temporary data storage 90, and then to destination application 14 as will be described in greater detail below. Of course, by incorporating modifications to active component 30 according to principles well known in the art, a variety of inputs may be acceptable to system 10, for example, inputs in XML or EDI format, or any other format.

The user may purchase system 10 including the components illustrated in FIG. 2 with modules 70 corresponding to those required for interface with the user's presently-used destination applications 14. For example, if the user runs Oracle Applications, the user may select from a variety of available modules pre-built to permit interface with one of the plurality of business applications packaged within Oracle (i.e., vendors, employees, items, purchase orders, receipts, customers, bills of material, accounting, manufacturing, supply chain, projects, human resources and sales). The user may choose between providing information describing its present source applications 12 to a developer or manufacturer of integration system 10 in order to facilitate pre-installation configuration of system 10 to operate with modules 70, or conducting on-site system configuration using configuration interface 100 as described above. As the user incorporates additional destination applications 14, additional modules 70 may be purchased and configured to provide interfaces among source applications 12 and newly incorporated destination applications 14. Consequently, integration system 10 according to the present invention requires no generation of custom software at the initial installation stage or at the upgrade stage, but instead uses a pre-packaged active component 30 with off-the-shelf modules 70 and is configurable to operate with the modules using the configuration interface 100 set-up process described herein.

Once interfaces are configured using the above-described process, the user may set up a destination application 14 to, for example, invoke integration system 10 on a periodic basis to insure that the data residing in destination application 14 is consistent with the data in source applications 12. For example, if inventory information is maintained on a spreadsheet source application 12 and modified as the inventory status changes throughout the day, and the inventory destination application 14 provided by Oracle is invoked to produce an inventory report on the following day (or after hours at the end of a particular day), the Oracle Inventory Application 14 may be configured to invoke integration system 10, thereby initiating data migration from spreadsheet application 12 to Oracle Inventory Application 14. As should be apparent from the foregoing, such data migration may occur periodically according to a predetermined schedule as described above, or be event-driven (for example, initiated by receipt of input data) or initiated manually, upon command of the user.

Figure 3:
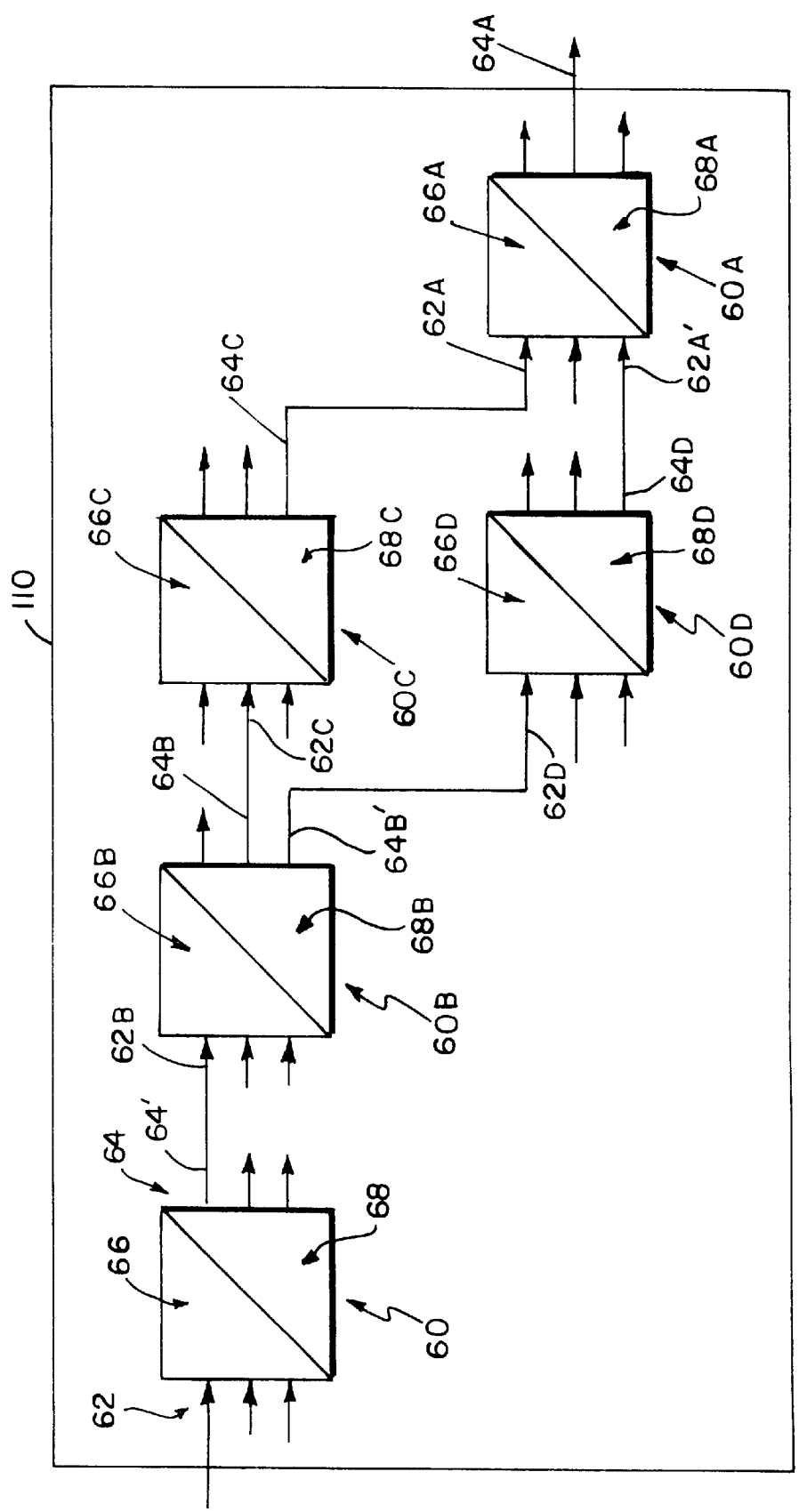
FIG. 3 is a block diagram illustrating an exemplary chain of data elements according to the present invention.
Figure 5:
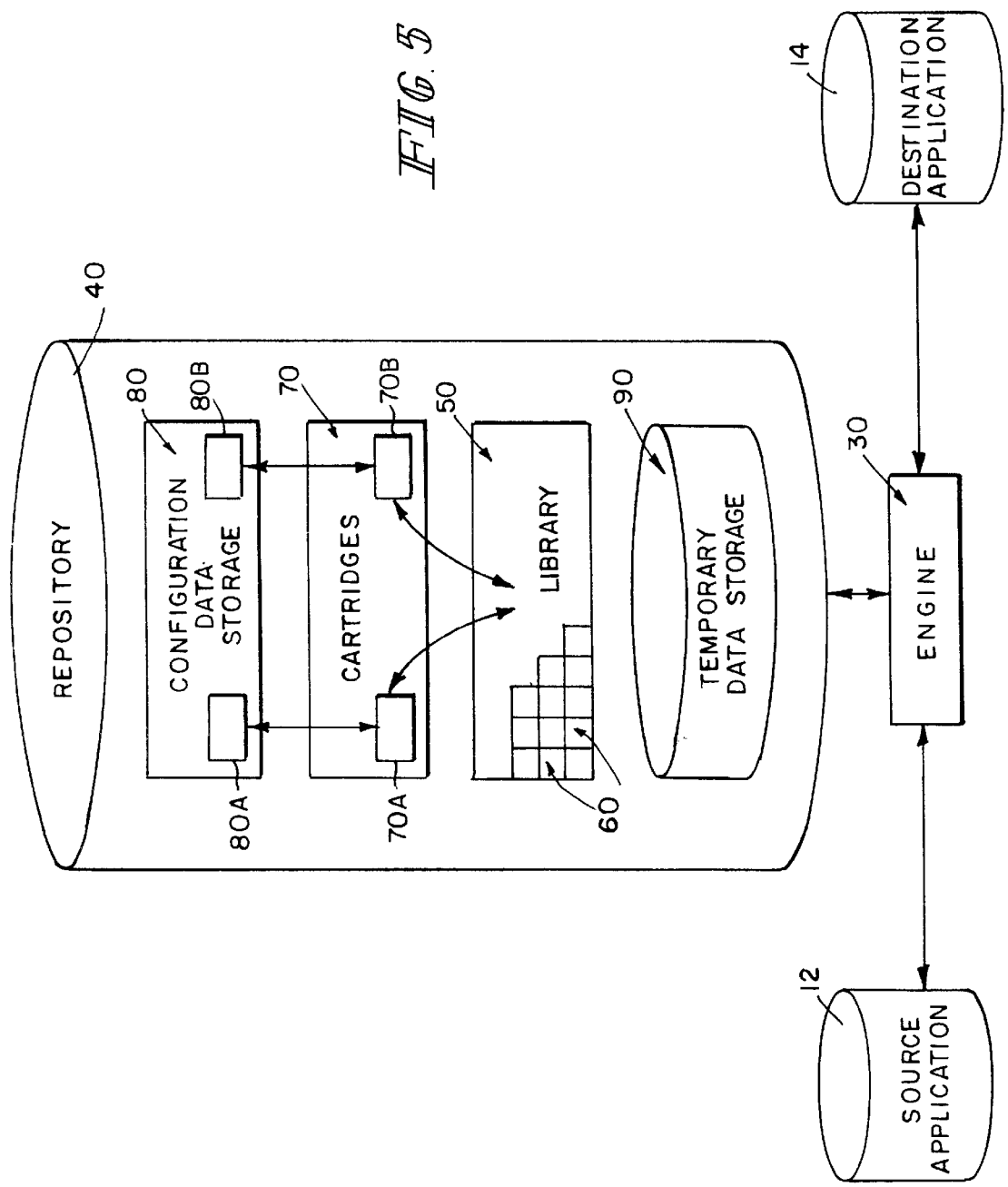
FIG. 5 is yet another block diagram similar to FIG. 4.

Referring now to FIGS. 3 and 5, each data element 60 within library 50 includes a combination of related inputs 62, related outputs 64, rules for translation and mapping (mapping rules 66), and rules for data validation (validation rules 68). These data elements 60 essentially consist of reusable code or units of work that perform a discrete data manipulation function, and may be shared among interfaces defined by modules 70. The data elements 60 are accessed and assembled into combinations of data elements (data element chains 110) when module 70 executes a function.

Figure 4:
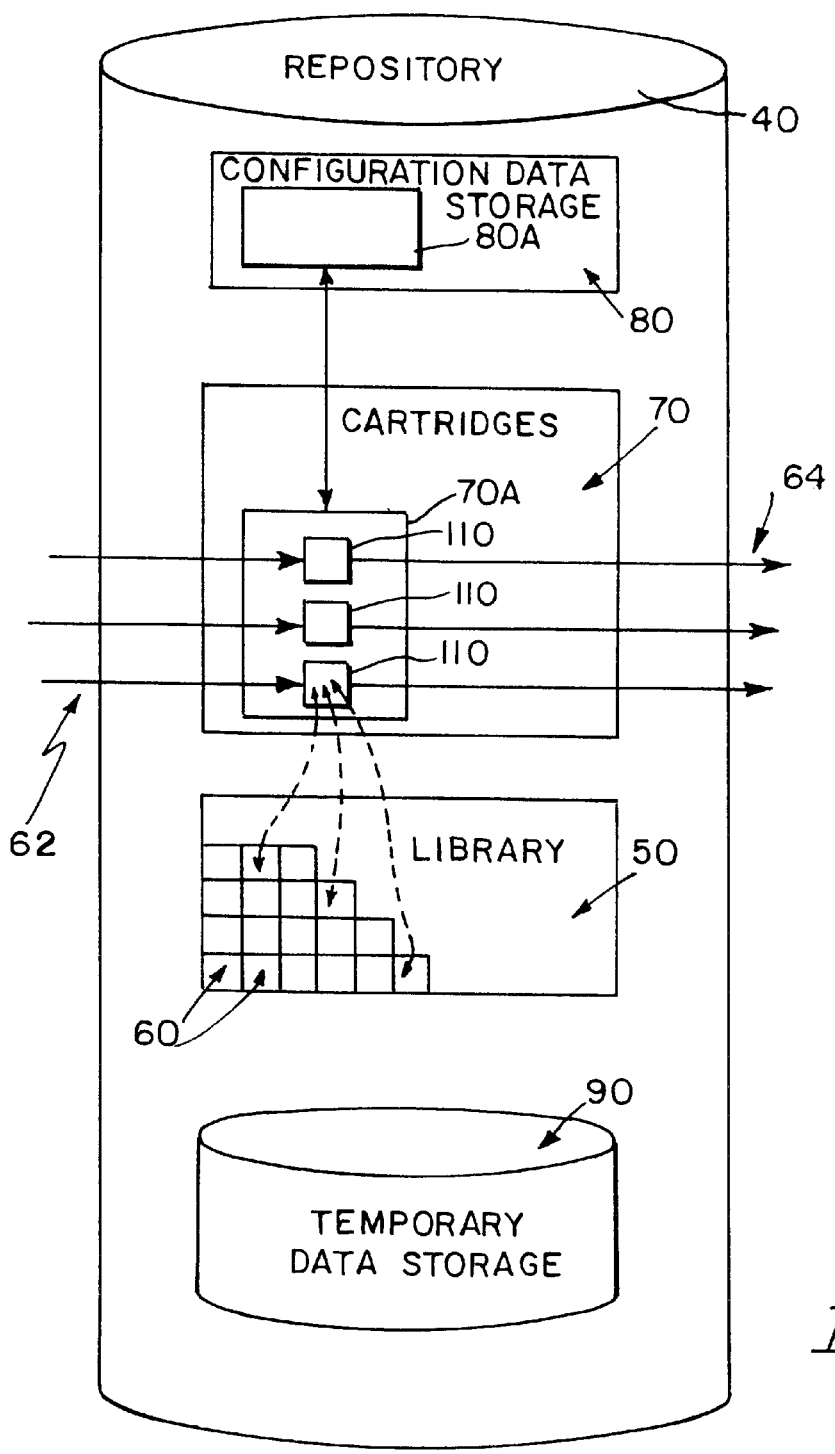
FIG. 4 is another block diagram of a portion of the integration system shown in FIG. 1.
Figure 6:
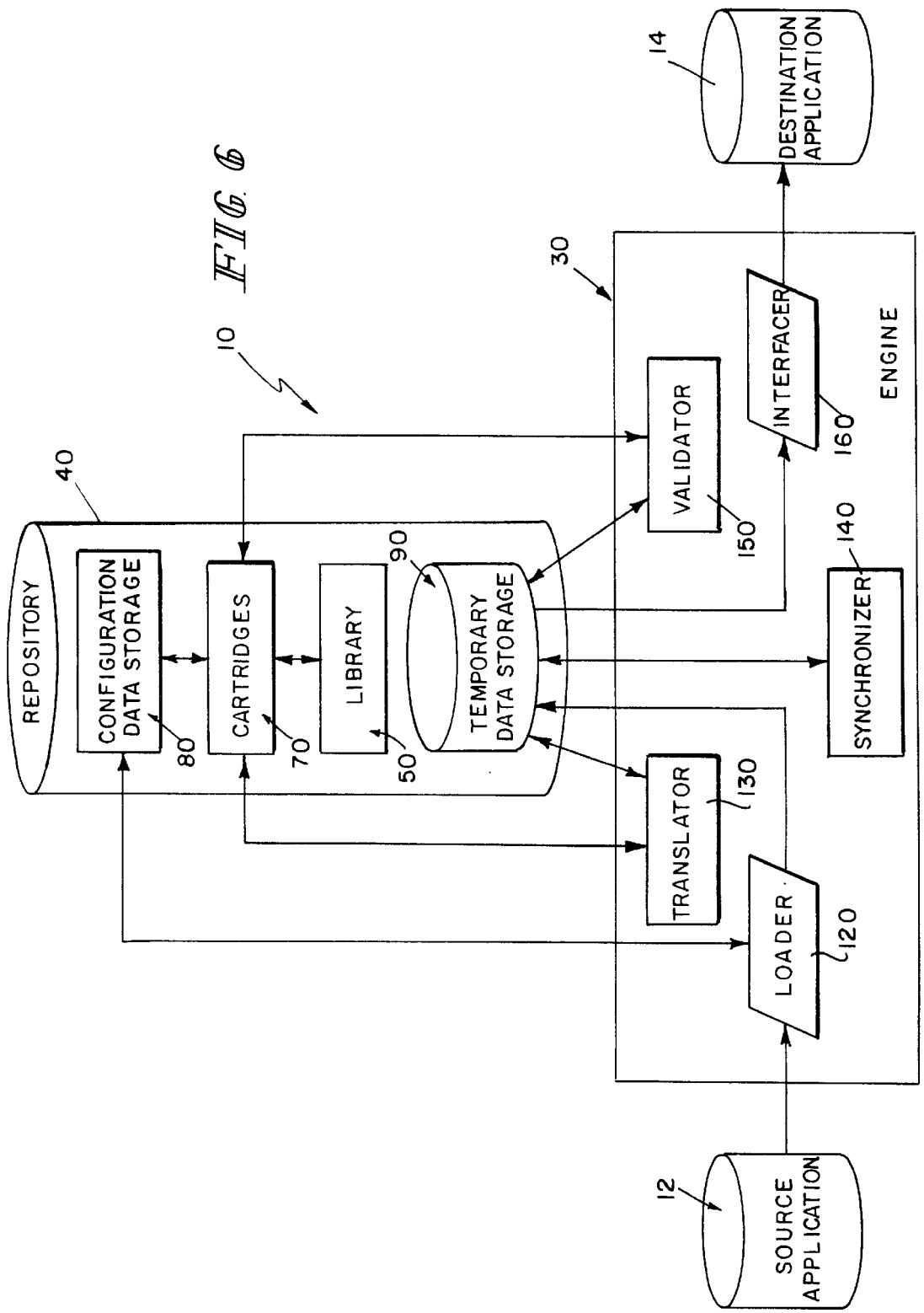
FIG. 6 is a block diagram illustrating the interaction between components of the integration system shown in FIG. 1.

FIGS. 4 through 6 illustrate the interaction between integration system modules 70, configuration data storage 80, and data element library 50. As indicated above, each module 70 is an add-on software cartridge which corresponds to a destination application 14. As indicated in FIGS. 4 and 5, each module 70A, 70B communicates with a portion of configuration data 80A, 80B, respectively, contained within configuration data storage 80 of repository 40, and repository library 50, containing a plurality of individual data elements 60. When active component translator 120 or validator 150 requests instructions from a particular module 70A for processing data in an interface table in temporary data storage 90, that portion of the active component 30 provides an input 62 to module 70A which module 70A interprets as a request for instructions to control that portion's process in achieving an output. Module 70A provides an instruction set for achieving the output which then calls upon a series of data elements 60 within library 50 to perform individual tasks that may be common to a variety of modules 70. Essentially, each module 70 includes a plurality of linked pointers to particular data elements 60 which together process input 62 to achieve desired output 64. Information regarding the data from source application 12 necessary to carry out this processing resides in configuration data portion 80A corresponding to the particular module, and is accessed by module 70A during this processing.

As depicted in FIG. 3, each data element 60 of a data element chain 110 (resulting from a chaining process carried out by cartridge 70) may include a plurality of related inputs 62, a corresponding plurality of related outputs 64, and mapping rules 66 and validation rules 68 typically applied to inputs 62 to generate outputs 64 which are validated within the data element. Outputs 64 of each data element 60 can populate a target column within a destination application 14, such as output 64A of data element 60A, operate as an input 62 for other data elements 60, such as outputs 64B, 64B', 64C, 64D of data elements, 60B, 60C, 60D, or determine the context in which other data elements 60 are to be used.

With an understanding of the characteristics of the data used by a particular destination application 14, chains 110 of data elements 70 may be constructed such that a variety of disparate inputs 62 to data element chain 110 can be processed to produce an appropriate output 64. In the example illustrated in FIG. 3, input 62 to data element 60 is mapped and validated as an output 64' which data element 60B receives as input 62B. The mapping and validation rules 66B, 68B incorporated in data element 60B produces two outputs 64B, 64B' which are used as inputs 62C, 62D to data elements 60C and 60D, respectively. Each of data elements 60C, 60D produces a single output 64C, 64D, respectively, which is combined with the output of the other as inputs 62A, 62A' to data element 60A. Data element 60A maps and validates inputs 62A, 62A' to produce a single output 64A which will ultimately be used to populate a data table within destination application 14.

FIG. 4 illustrates multiple data element chains 110 (representing multiple module instruction sets) contained within a single module 70A, each accessing a plurality of data elements 60, many of which may be common to each data element chain 110, for producing a desired output 64. Each module 70A may execute a variety of chaining processes, creating complex, "virtual" data elements by connecting the input 62 and output 64 of several simple data elements 60 to provide a series of possible interface functions that may be requested of module 70A depending on the destination application 14 to which module 70A relates. As should be apparent from the foregoing, modules 70 do not actually contain data elements 60, but rather contain information describing where they may be found in library 50.

For example, an input from a source application 12 may correspond to the name of a particular contact individual within an organization. After configuration data storage 80 of repository 40 has been configured to recognize the contact name data from source application 14, and the contact name data has been loaded into an interface table within temporary data storage 90 of repository 40, data element chain 110 may be called upon by active component 30 to provide appropriate profile information related to the contact (or the contact's organization) acceptable for population in a table within destination application 14. Data element 60 of data element chain 110 may receive the data as input 62 through translator 130 (as described in greater detail below) and, by consulting configuration data portion 80A associated with the particular module 70A, may recognize that the contact name data within source application 12 includes the first, middle, and last name of the contact all within one field. Because module 70A may be configured to operate with a particular destination application 14, appropriate data elements 60 will be chained to convert source application 12 contact name data into a format acceptable to destination application 14. This format may include a contact number which corresponds to the contact's last name. Accordingly, input 62 to data element 60 may be mapped by mapping rules 66 to provide an output 64' which consists of the contact's last name. Output 64' is provided as an input 62B to data element 60B. Mapping rules 66B within data element 60B convert the data representing the contact's last name into a number used to identify the contact in various tables throughout destination application 14. This contact number is provided as output 64B. Additionally, input 62B produces an output 64B' which corresponds to an organization number representing the organization to which the contact individual belongs. Output 64B is provided as input 62C to data element 60C. Similarly, output 64B' is provided as input 62D to data element 60D. Data element 60C accesses contact profile information located in a table of destination application 14 corresponding to the contact name present as input 62C. Output 64D of data element 60D corresponds to profile information associated with the organization number present at input 62D. Outputs 64C, 64D are provided as inputs 62A, 62A' of data element 60A. Mapping rules 66A of data elements 60A provide for one-to-one mapping of input 62A or input 62A'. Validation rules 60A associated with data element 60A access yet another Oracle table in destination application 14 to determine whether, given the context of the present operation, the contact profile information is valid. Data elements 60A may include instructions, for example, which require that in the context of the present transaction, the presence of both contact number input 62A and organization number input 62A' require an output of the organization number at output 64A.

Additional data elements 60 in other chains 110 may be called upon by module 70A to reconcile differences in the input data, such that the output is usable by destination application 14. For example, data element 60 may be invoked which maps an input 62 of an organization name including "Inc." to an output 64 of the organization name without "Inc." Since the units of work represented by each data element 60 may be applicable to a variety of chains 110 within various modules 70 (i.e., the first step in a variety of operations may be to strip the "Inc." from an input organization name), data elements 60 within library 50 may be used by a variety of modules 70 depending upon the configuration of the instruction sets or chains 110 within the module. Accordingly, modifications relating to a variety of destination applications 14 may be accommodated by relatively few changes to the appropriate data elements 60 within library 50 that will be called upon by the plurality of modules 70 directing interface to the destination applications 14.

In operation, when destination application 14 requests data held in a file or database residing in source application 12, for example, an appropriate module 70 corresponding to the particular destination application 14 responds to the data request from the destination application 14 by instructing active component 30 to obtain or receive data from source application 12. Module 70 assembles these instructions in response to the input data request by compiling various data elements 60 within repository library 50 (FIGS. 4 and 5) according to the predetermined instruction sets designed into the module. Modules 70 then instruct active component 30 to process the data, as described in greater detail below, such that it is transferable and useable by destination application 14.

The standard methodology for accomplishing data migration from source application 12 to destination application 14 is illustrated schematically in FIG. 6. As shown in FIG. 6, integration system active component 30 includes a loader 120, a translator 130, a synchronizer 140, a validator 150, and an interfacer 160. Upon receipt of appropriate command sets corresponding to, for example, a request for data stored in source application 12, loader 120 communicates with configuration data storage 80 of repository 40 to determine the characteristics of the source data and the specific manner in which the data should be loaded into temporary data storage 90 in the repository. Loader 120 then reads or receives the data from source application 12, and populates the appropriate table in temporary data storage 90.

Next translator 130 communicates with the appropriate module 70 corresponding to destination application 14 to obtain instructions for translating the source data into destination data for updating tables within temporary data storage 90. During this process, integration system 10 performs a net change function wherein synchronizer 140 accepts as inputs all data loaded by loader 120, but compares these data inputs to data residing in destination application 14 and returns only those data inputs that have been updated, deleted, or are new relative to the previous execution of the same data migration process. This net change function insures that all data modifications in source application 12 are correctly represented in destination application 14 at the end of each run. Of course, integration system 10 may be configured to accept as inputs only inserted, updated, or deleted data from source application 12 relative to destination application 14. Under this configuration, source application 12 is utilized to determine the differences between the data as it exists during the present run and as it existed during the prior run of integration system 10.

Validator 150 of active component 30 next communicates with the appropriate module 70 in repository 40 to determine whether the data residing in the active interface table of temporary data storage 90 has been properly translated and processed, such that its content is consistent with the configuration parameters residing in configuration data storage 80 associated with module 70, and its format is appropriate for populating destination application 14. Upon detecting errors, validator 150 marks records as being invalid and generates a report for transmission to destination application 14. After the data from source application 12 has been loaded, translated, synchronized, and validated, interfacer 160 moves the data from the interface table of temporary data storage 90 into an appropriate table residing in destination application 14.

While this application has been described as having exemplary embodiments, this application is intended to cover any variations, uses, or adaptations using its general principles. Further, this application is intended to cover such departures from the present disclosure as come within the known or customary practice within the art to which it pertains. The spirit and scope of the invention are to be limited only by the terms of the appended claims.

What is claimed is:

1. A system for integrating data among heterogeneous source applications and destination applications, comprising:
   a repository of information relating to the source applications and the destination applications, the repository including a plurality of data elements each being capable of performing a discrete operation on a piece of data, and a first module including a plurality of instruction sets, each instruction of each instruction set activating a data element; and
   an active component connected to the repository having an input for loading data from the source applications, and an output for populating the destination applications with processed data, the active component processing the data from the source applications by activating data elements according to the plurality of instruction sets in the module.

2. The system of claim 1 wherein the plurality of instruction sets are predefined to facilitate interface with a particular destination application.

3. The system of claim 1 further comprising a second module including a plurality of instruction sets, each instruction of each instruction set activating a data element, the first module plurality of instruction sets being defined for interface with a first group of destination applications, the second module plurality of instruction sets being defined for interface with a second group of destination applications.

4. The system of claim 3 wherein at least one data element of the plurality of data elements is activated by both the first module plurality of instruction sets and the second module plurality of instruction sets.

5. The system of claim 3 wherein the repository further includes configuration data storage for storing configuration data describing data in the source applications, the configuration data storage including a first portion used by the first module and a second portion used by the second module.

6. The system of claim 1 wherein the temporary data and the data elements are stored in a relational database.

7. The system of claim 1 wherein the repository is capable of receiving a plurality of modules.

8. The system of claim 1 wherein the destination applications are included within an ERP product.

9. The system of claim 1 wherein the active component is capable of loading entire files from a source application.

10. The system of claim 1 wherein the repository further includes a library for storing the plurality of data elements.

11. The system of claim 1 wherein the repository further includes temporary data storage for storing data temporarily as the data is being processed for introduction into a destination application.

12. The system of claim 11 wherein the first module includes a plurality of predefined tables which are selectably installed in the temporary data storage to receive temporary data, each of the predefined tables being configured for compatibility with a destination application.

13. The system of claim 12 wherein each predefined table includes a plurality of selectable destination tables residing within the destination applications which are compatible with the predefined table.

14. The system of claim 11 wherein the repository further includes configuration data storage for storing configuration data describing data in the source applications and data in the temporary data storage, the active component loading data from the source applications into the temporary data storage according to the configuration data.

15. The system of claim 14 further comprising a configuration interface for generating the configuration data, the configuration interface providing a series of screens to assist the user in describing the source applications.

16. The system of claim 14 wherein the active component input is a loader which reads data in a source application and populates the temporary data storage with the source application data according to the configuration data.

17. The system of claim 14 wherein the active component further includes a validator which communicates with the module to verify that the data residing in the temporary data storage is consistent with the configuration data associated with the module and properly formatted for populating the destination application.

18. The system of claim 1 wherein the active component may be activated by the destination application to integrate data periodically according to a predetermined schedule.

19. The system of claim 1 wherein each of the plurality of data elements includes related inputs, related outputs, mapping rules, and validation rules.

20. The system of claim 19 wherein each of the data element outputs may populate a destination application, provide an input to another data element, or indicate the context of another data element's operation.

21. The system of claim 1 wherein the active component further includes a translator which communicates with the module to translate data from the source application into data acceptable to the destination application according to the plurality of instruction sets in the module.

22. The system of claim 1 wherein the active component further includes a synchronizer which compares the data loaded from the source application into the temporary storage to data residing in the destination application and returns to the temporary data storage only data which differs from the data residing in the destination application.

23. A system for integrating data among heterogeneous source applications and destination applications, comprising:

configuration data storage for storing configuration data relating to the source applications;

temporary data storage for storing temporary data being integrated among the source and the destination applications;

a library of data elements, each data element performing a predefined function;

a first module including a plurality of instruction sets, each instruction set specifying a plurality of data elements to form a chain of data elements; and an active component operably associated with the configuration data storage, the temporary data storage, the library, and the first module, the active component including a loader for loading data from the source applications to the temporary data storage according to the configuration data relating to the source applications, and an interfacer for populating the destination applications with data from the temporary data storage after the data is processed by the active component, the active component processing the data by communicating with the first module and activating data element chains according to instruction sets of the first module.

24. The system of claim 23 wherein the plurality of instruction sets of the first module are configured to operate with a particular destination application.

25. The system of claim 23 further comprising a second module including a plurality of instruction sets specifying chains of data elements, at least one of the data elements specified by the instruction sets of the first module also being specified by the instruction sets of the second module.

26. The system of claim 23 wherein the configuration data, the temporary data, and the data elements are stored in a relational database.

27. The system of claim 23 wherein the first module includes a plurality of predefined tables which are selectably installed in the temporary data storage, each predefined table being capable of receiving data from a source application.

28. The system of claim 27 wherein each predefined table is configured for compatibility with a destination application.

29. The system of claim 23 wherein each of the data elements includes inputs, outputs, mapping rules, and validation rules.

30. The system of claim 23 further comprising a configuration interface including a series of screens for permitting the user to describe the source applications, the configuration interface generating configuration data relating to the source applications.

31. The system of claim 23 wherein the active component further includes a validator which communicates with the first module to verify the content and format of the temporary data against the configuration data.

32. The system of claim 23 wherein the active component further includes a translator which communicates with the first module to translate data from the source applications according to the data element chains.

33. The system of claim 23 wherein the active component further includes a synchronizer which carries out a net change function wherein the synchronizer compares data in the destination applications to the temporary data and updates the temporary data such that the temporary data reflects the differences between the temporary data and the data in the destination applications.

34. A data integration system for providing end-to-end integration between a plurality of source applications and a destination application, the system comprising:

repository means for containing information relating to the source applications and the destination application, the repository means including temporary storage means for storing temporary data from the source applications, configuration storage means for storing configuration data describing data in the source applications and in the temporary storage means, library means for storing a plurality of data element means for performing data interface functions, each of the data element means being capable of performing a single data interface function, and module means for providing instructions for executing predefined series of data element means; and active component means for moving data from the source applications to the temporary storage means, processing the data according to the module means instructions, and populating the destination application with resulting data residing in the temporary storage means.

* * * * *